UNITED STATES PATENT OFFICE.

VIGGO DREWSEN, OF LARCHMONT, NEW YORK, ASSIGNOR TO WEST VIRGINIA PULP AND PAPER COMPANY, OF NEW YORK, N. Y., A CORPORATION OF DELAWARE.

PROCESS OF MAKING MAGNESIA AND CALCIUM PENTASULPHIDE.

No Drawing. Application filed December 11, 1923, Serial No. 680,043. Renewed October 8, 1926.

This application relates especially to processes of making magnesia and calcium pentasulphide from magnesian or dolomitic lime, the magnesia being recovered as precipitated magnesium hydroxide which may be calcined to the oxide form or converted into the carbonate, if desired. Dolomitic lime containing considerable proportions of magnesia may be thoroughly slaked in any suitable way and the ordinary impurities removed by decantation methods, the mixed calcium and magnesium hydroxide being washed off in water suspension in which they are preferably present to the extent of ten to fifteen per cent or more by weight. This milk of lime is then run into a steam cooker or digester in which sulphur in any convenient form, such as roll sulphur or flowers of sulphur, is added in sufficient quantity to react with the calcium hydroxide present. Then the mixture is heated and agitated as by steam jets or external heating methods which preferably carry the temperature up to about 110 to 120° C. where a pressure digester is used. This high temperature is advantageous in melting the sulphur and also promoting the reactions that take place between the sulphur and the hydrated lime, which seem to occur in accordance with the following equation:

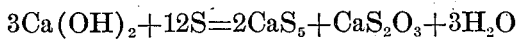

$$3Ca(OH)_2 + 12S = 2CaS_5 + CaS_2O_3 + 3H_2O$$

The calcium pentasulphide and the calcium thiosulphate produced are both in solution and may be separated by filter press or decantation methods so as to secure a relatively concentrated solution of calcium pentasulphide for fibre treating, insecticide spraying, etc. The magnesium hydroxide present in the original milk of lime is not acted on chemically to any substantial extent during the production of the calcium pentasulphide and is present at the end of the reaction as a finely divided precipitate which may be washed and dried to secure a high grade of commercial magnesium hydroxide which represents substantially all the magnesia present in the slaked dolomitic lime. If desired, this magnesium hydroxide may be calcined into the form of magnesium oxide or it may be readily converted by percolating carbon dioxide through a water suspension of the hydroxide to form magnesium carbonate which may be dried and sold in this form.

This invention has been described in connection with a number of illustrative materials, proportions, conditions, temperatures, concentrations and orders of steps, to the details of which disclosure the invention is not of course to be limited, since what is claimed as new and what is desired to be secured by Letters Patent is set forth in the appended claims:

1. The process of making magnesia and calcium pentasulphide from dolomitic lime which comprises, thoroughly slaking dolomitic lime and removing impurities therefrom, cooking under pressure a strong water suspension of such slaked dolomitic lime, which is present in the suspension to the extent of over ten per cent by weight, with sulphur to form calcium pentasulphide solution and precipitated magnesium hydroxide, and separating from the solution the magnesium hydroxide and calcining the same into magnesium oxide.

2. The process of making magnesia and calcium pentasulphide from dolomitic lime which comprises, thoroughly slaking dolomitic lime and removing impurities therefrom, cooking a strong water suspension of such slaked dolomitic lime with sulphur to form calcium pentasulphide solution and precipitated magnesium hydroxide, and separating from the solution the magnesium hydroxide.

3. The process of making magnesia and calcium pentasulphide from dolomitic lime which comprises, cooking under pressure a strong water suspension of slaked dolomitic lime, which is present in the suspension to the extent of about ten to fifteen per cent, with sulphur to form dissolved calcium pentasulphide and calcium thiosulphate and precipitated magnesium hydroxide, separating the magnesium hydroxide from the solution.

4. The process of making magnesia and calcium pentasulphide from dolomitic lime which comprises, cooking a strong water suspension of slaked dolomitic lime with sulphur to form dissolved calcium pentasulphide and calcium thiosulphate and precipitated magnesium hydroxide separating the magnesium hydroxide from the solution.

5. The process of making calcium pentasulphide from dolomitic lime which comprises, heating and agitating a strong water suspension of slaked dolomitic lime with sulphur to form calcium pentasulphide solution and precipitated magnesium hydroxide, separating from the solution the magnesium hydroxide, and converting and drying the same.

6. The process of making calcium pentasulphide from dolomitic lime which comprises, heating a water suspension of slaked dolomitic lime with sulphur to form calcium pentasulphide solution and precipitated magnesium hydroxide.

7. The process of treating dolomitic lime which comprises, effecting the chemical reaction of sulphur with a water suspension of slaked dolomitic lime to form calcium pentasulphide and magnesium hydroxide, and separating magnesium hydroxide from the reaction products.

8. The process of treating dolomitic lime which comprises, effecting the chemical reaction of sulphur with slaked dolomitic lime to form calcium pentasulphide and magnesium hydroxide, and separating magnesium hydroxide.

VIGGO DREWSEN.